June 18, 1935.  R. C. BROWNE  2,005,451
HIGH VOLTAGE ELECTRICAL MACHINE
Filed May 23, 1932  2 Sheets-Sheet 1
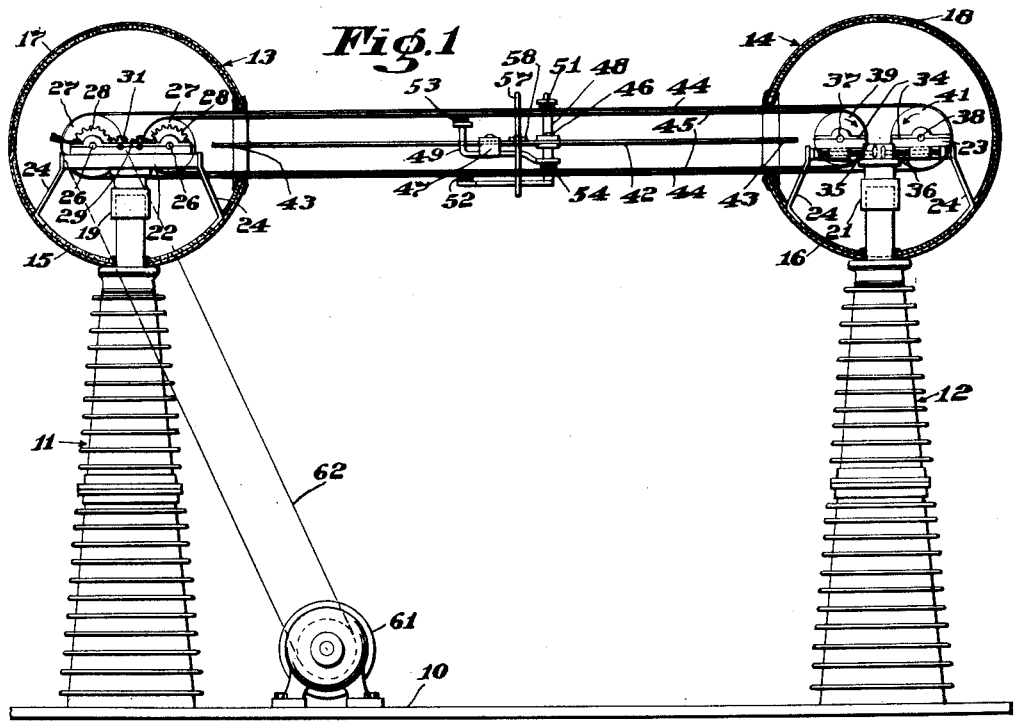
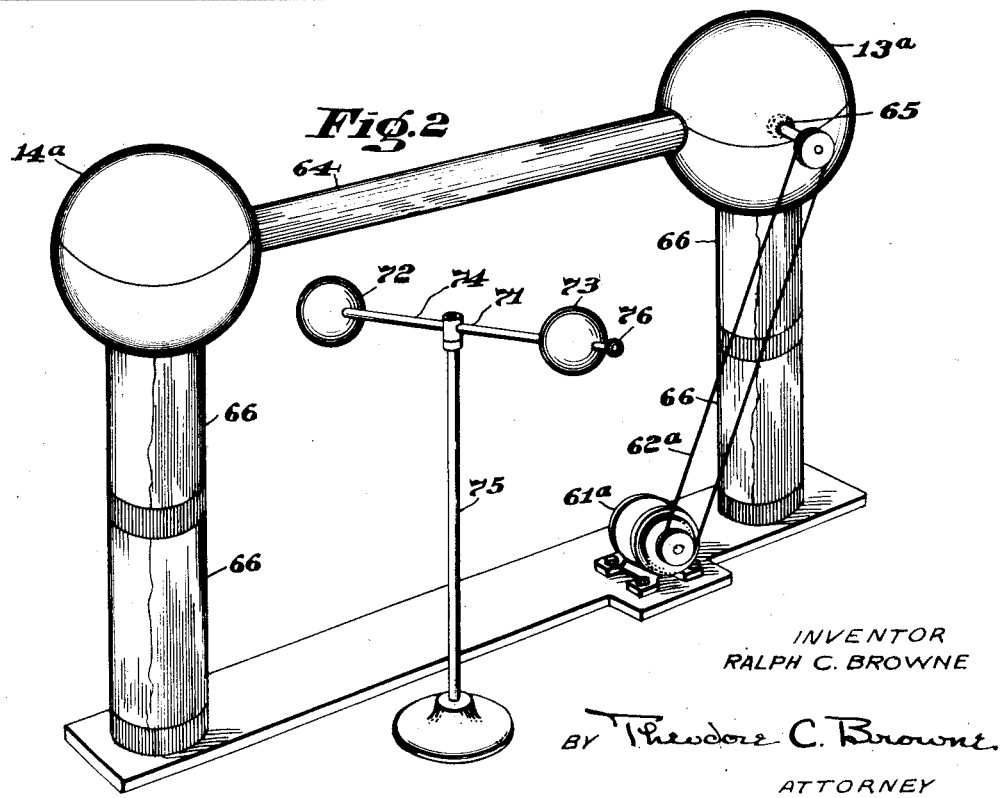
INVENTOR
RALPH C. BROWNE
BY Theodore C. Browne
ATTORNEY

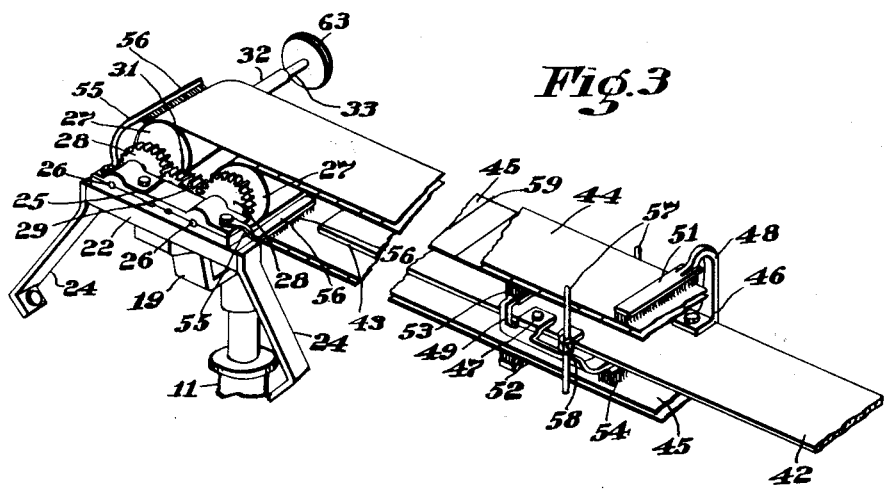
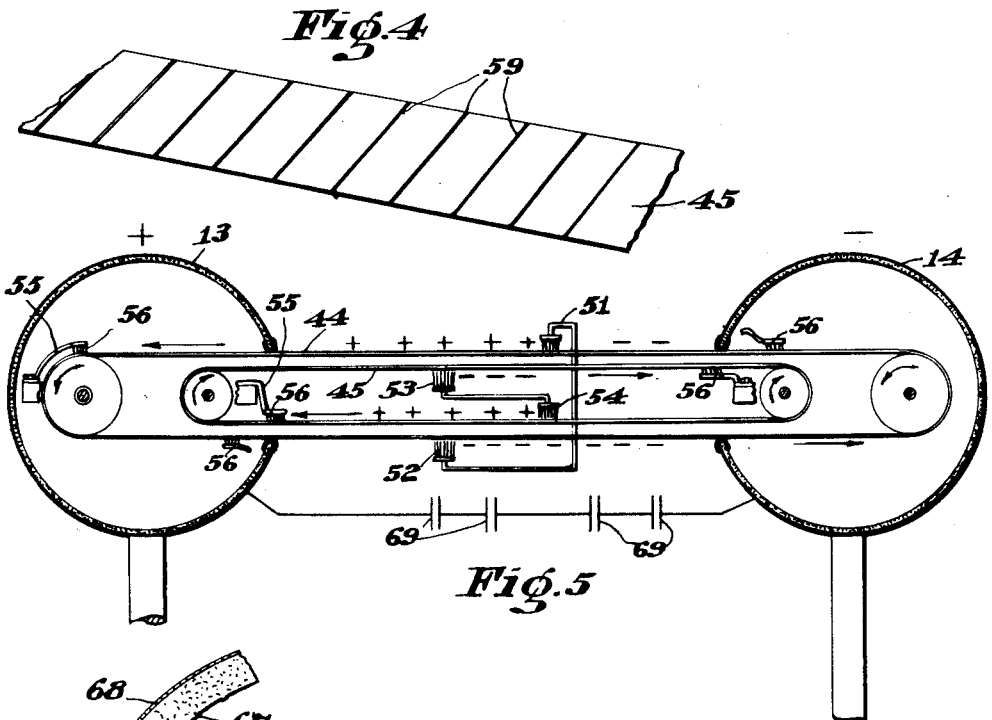

Patented June 18, 1935

2,005,451

UNITED STATES PATENT OFFICE 2,005,451

HIGH VOLTAGE ELECTRICAL MACHINE

Ralph C. Browne, Salem, Mass.

Application May 23, 1932, Serial No. 612,907

15 Claims. (Cl. 171—329)

In electrical machines of the influence type, the design now recognized as the most effective and dependable is Wimshurst's. Very high voltages have been developed, but so far as I am aware, sufficiently high voltages for insulator testing and for simulating transients on power lines never have been attained by Wimshurst apparatus, yet these two instances alone indicate that a simple machine producing enormously high voltages is needed. Despite its simplicity, the Wimshurst machine is essentially fragile and soon reaches a practical limit because it is not possible to run glass plates at any considerable rim speed. In such machines, the closer the positive and negative charges are brought together before their separation, the higher the resulting voltage. The charges cannot be brought close together if heavy glass plates are required for strength. Such plates defeat their own purpose. Both disc and cylinder machines are further limited by their very construction which fixes the maximum distance separating the high voltage positive and negative charges and in turn limits the voltage attainable.

Among the several objects of this invention are: to make a self-exciting, high potential electrical machine not subject to the limitations heretofore described: to overcome leakage by providing means by which charges of opposite sign can be accumulated at widely separated points: to allow charges of opposite sign to approach each other initially more closely than has heretofore been possible: to produce a machine wherein the charge carrying parts may easily be surrounded by atmospheres of pure or compressed gases: to provide means of overcoming excessive mechanical friction caused by electrostatic attraction between the moving parts: and to produce a machine having surfaces of an area sufficient to retain the charges without material corona loss.

These and other objects will become apparent as the specification proceeds and from the drawings in which Fig. 1 is a vertical section through the device showing, however, certain parts in elevation.

Fig. 2 is a perspective view of the device when adapted to be insulated by a compressed gas.

Fig. 3 is a perspective view (with the charge collector removed) showing the driving assembly, the charge carriers, and neutralizing apparatus in assembled relation.

Fig. 4 is a top perspective view of a portion of one charge carrier.

Fig. 5 is a schematic electrical diagram.

Fig. 6 shows a small portion, in section, of one charge collector of a type used when the collectors must be very large.

The device comprises a base 10, carrying two standards 11 and 12 made of substantial pillar insulators or columns of boro-silicate glass. The upper end of each standard is surrounded by a large metal ball 13 and 14 which serve as electrical charge collectors. Preferably, both balls are made of spun hemispheres of copper 15, 16, 17, 18, joined horizontally as shown. Extensions of the standards 11 and 12 in the interior of the collectors 13 and 14 fit into the heads 19 and 21 to which are attached suitable conductive frames 22 and 23. The spheres are supported by the brackets 24, 24.

At the driving end of the machine, the frame 22 bears a pillow block 25 which supports the axles 26, 26 which in turn carry the very slightly crowned pulleys 27, 27 and the gears 28, 28. (Fig. 3.) The pulleys must be nearly flat; if crowned to the conventional extent, the belts will not operate satisfactorily. Two gears 29 and 31, carried on small studs, cause the pulleys to turn in opposite directions. One axle 26 terminates in a sleeve 32 into which a shaft 33 made of insulating material is fastened. This is the driving shaft. Except in an alternative form of my device later described, it extends beyond the collector 13 and for very high voltages may be elongated to several feet ending, if necessary, in an outboard bearing (not shown).

On the driven end of the machine, the frame 23 carries the pillow blocks 34, 34. They are held in slides and are adjustable for longitudinal position by means of the screws 35 and 36. The free axles 37 and 38 carry the idle pulleys 39 and 41. A strip 42 of glass or an equally good insulator extends from collector 13 to collector 14 and, preferably, is provided with the short tongues 43, 43 which extend into the body of the collectors.

Stretched over the pulleys and held taut are two endless belts 44 and 45 made of silk ribbons thoroughly impregnated with varnish. I shall call the belts "electrical charge carriers" to conform with the literature in which "carrier" denotes the part itself which bears the high potential charge brought to the collector. The neutralizing apparatus consists of two brackets 46 and 47 which fit closely over the glass plate 42 as shown in detail in Fig. 3. Metal arms 48 and 49 are held by the brackets. The arm 48 holds a neutralizing "comb" 51 above the outer carrier 44 and holds a like comb 52 beneath the same carrier, but offset several inches as shown. The arm 49 holds a neutralizing comb 53 beneath the inner surface of the inner carrier 45 and also holds a comb 54 above the inner surface of the same carrier, but offset in the same manner as above. The combs 51, 52, 53, and 54 just fail to touch the carriers; they may be of the conventional saw-tooth type, but I prefer to use a comb resembling an all-metal hairbrush. The multiplicity of points, I believe, improves the performance. Contacting brushes may be used, but the neutralizing apparatus I have described is very effective and saves wear on the belts. Wire yokes 55, 55 are clipped under the cap screws holding the bearing caps and act as conductive supports for the tinsel brushes 56, 56. The belts forming the carriers are guided by the glass rods 57, 57 which are held by the clips 58, 58 attached to the glass plate 42. From this central position, the belts may be guided effectively and the potential difference between the carriers and hence across the guides is at a minimum. The carrier 45 bears a large number of transverse strips 59, 59 etc. across its outer face. These may be merely strips of adhesive tape, ribs of rattan, stitched-on cording, flat pleats, or even rows of heavy stitching as a flat-lock seam. A motor 61 drives the device through the rubber belt 62 and the pulley 63.

The two collectors are shown joined by a large glass tube 64 in Fig. 2. Gas tight joints are made between the tube and the collectors 13a and 14a and between the halves of the collectors themselves. Since any projection on the collectors will cause leakage of charge, the stuffing-box 65 is wholly within the collector 13a. In this manner, a tight assembly is formed which is then filled with a pure gas or with a compressed gas. The resistance of the leakage paths in the machine is greatly increased by a pure atmosphere or by increased pressure, consequently, much higher potentials are reached. The drawing also indicates that large Leyden jars 66, 66 may form the standards if the leakage path is of sufficient length.

Fig. 6 illustrates a type of collector which is inexpensive and very useful when extremely large spheres are needed. It is made of plaster, 67 reinforced as is common in plaster moulding technique and covered with metal leaf or foil 68.

The electrical circuit is shown in Fig. 5. The capacity of the collectors with respect to ground is large and operation is possible without added capacity, but when more capacity is desired, it may be put in as a bank of condensers 69, 69, etc. connected in series. Leyden jars with very long leakage paths are desirable.

The discharging conductor 71 is shown in Fig. 2. It consists of two metal balls 72 and 73 held on the metal rod 74. The standard 75 is of impregnated wood. The polarity of the discharge can be predetermined by adding the small ball 76 as shown. The discharge will then pass from the small ball 76 to the collector at which it points.

The operation is as follows: When the shaft 33 revolves, the two carriers move in opposite directions. Immediately, the electrostatic attraction between the moving carriers sucks them together, demanding, because of friction, an unreasonable power input. It is here that the importance of the cross strips 59, 59 is seen. Each strip acts as a wedge which, due to the relative motion, forces the carriers apart as they move along. When the cross strips are in place, the carriers run freely and the power required is reasonable. Equivalent wedges might be used. A grill of glass rods might be placed between the carriers etc., but fixed separators or wedges are difficult to insulate. In consequence, I prefer the cross strips or cross stitching.

Along the faces of the wedges at least, the two carriers actually rub together. In that respect, my device differs from a conventional influence machine. I believe, however, that its operation follows the Wimshurst principle. This and the following are suggested explanations of what may take place and the validity of my invention is in no way dependent upon the accuracy of my opinion. In Fig. 5, suppose a small positive charge exists on the carrier 44 opposite the comb 53. Such a charge then induces a negative charge at the comb 53 and a positive charge at the comb 54. The positive charge is communicated to the inner surface of the inner carrier 45 which moves towards the left past comb 52. In passing 52, it induces a negative charge at 52 and a positive charge at 51, resulting in a transfer of a negative charge to the lower outer surface of carrier 44 which moves to the right, and a positive charge to the upper outer surface of 44 which moves to the left. The increased charges increase the induction processes previously described. A rapid building-up effect is the result which may be compared to the more familiar "feed-back" phenomena. The effect of the machine is to separate the positive and negative charges which exist in the regions 51—53 and 52—54, and to carry them to their appropriate collectors.

The capacity of the collectors is much larger than the capacity of the carriers, therefore, the charges transported to the collectors are accumulated by them. The carriers may be punctured by discharge through them to the pulleys unless collecting brushes which positively connect the collectors with the carriers are added. They may be associated with the pulley assembly, connect the surface of the belts directly to the collectors at the entrance thereto, or be intermediately placed without affecting the operation of the machine. Brushes bearing on the inner belt are used only when the pulleys 27 and 39 are non-conductive.

The glass plate 42 probably increases the resistance of the leakage path between the oppositly charged portions of the carriers. It may have some inductive effect upon the charges on the carriers. At any event, much higher voltages are obtained with it in place. For mechanical reasons, a certain minimum space is required by the neutralizing assembly, but nothing is gained by spreading the combs further along the carriers, for as they approach the collectors, the insulation of the machine is cut down. Metallic sectors may be attached to the belts. If used, the machine is always self-starting. Mechanically, however, they are troublesome because of the high speed of the belts and the short radius of curvature of the pulleys. Consequently, I prefer to omit them and to rub the carrier slightly, if necessary as the machine starts.

The literature is replete with instruction that, to prevent leakage or corona loss, the "prime conductors" i. e. the collectors, should be as large as possible and have rounded contours. By my construction, not only is it possible to make the "prime conductors" spherical, the ideal rounded shape, but they may be as large as is desired. The literature also divides electrical charges into "Bound" and "Free", bound denoting those charges in immediate juxtaposition to a charge of opposite sign; free, those charges released from such influence as the result of some application of force. This is a convenient distinction which I adopt.

The advantages of my design are: charges of opposite sign are widely separated leading to good insulation: they are initially brought much closer together and separated at much greater speed: the charges are accumulated on ideally shaped collectors which have sufficient area to minimize corona or leakage loss: the device is completely self-exciting: it develops tremendous potentials. One machine in which the collectors are eighteen inches in diameter, the carriers five inches wide, the belt speed about eighteen hundred feet per minute, and having a free space of sixty inches between the collectors will, when driven by a one-quarter horse power motor, give a sixty inch discharge in the dry air of an ordinary room.

According to the statutory requirement, I have described and shown the preferred forms of my device, but I intend no limitation thereby except as determined by the appended claims.

What I claim therefore is:

1. An electrical machine comprising a plurality of moving belts adapted to carry electrical charges, a charge conducting system comprising conductively connected electrodes facing oppositely moving portions of said belts adapted to cooperate with the belts to result in the generation of free charges of opposite sign, collectors for utilizing the accumulation of such charges, and means for reducing the friction between the belts.

2. In an electrical machine wherein two endless belts move in close proximity, means to prevent the electrostatic attraction between the belts from causing excessive friction which includes wedging means interposed between the belts.

3. In an electrical machine, a charge carrier comprising an endless belt of flexible material, a second charge carrier in close proximity thereto, and means attached to one of the carriers adapted to wedge the carriers apart against electrostatic attraction.

4. In an electrical machine, means to collect electrical charges of each sign, means comprising oppositely moving belts one within the other to carry the charges to the collecting means, and means to prevent electrostatic attraction acting upon said belts from causing excessive frictional loss.

5. An electrical machine comprising two charge collectors, a tube of insulating material extending between the collectors, charge carriers comprising a movable belt disposed within the tube, the collectors and tube being joined in a gas-tight manner, whereby predetermined gaseous conditions may be maintained within the assembly.

6. An electrical machine including a pair of hollow electrical charge collectors having their outer surface exposed to the atmosphere, a traveling electrical charge carrier comprising a movable belt, partly within said charge collectors, and an envelope extending around said charge carriers and connected to said charge collectors to provide a substantially air-tight chamber around said charge carrier.

7. A self-exciting electrical machine comprising two hollow bodies serving as charge collectors, a plurality of driving pulleys mounted in the interior of one collector, a plurality of driven pulleys mounted in the interior of the other collector, electrical charge carriers borne by the pulleys and extending between the collectors, and charge conducting means comprising conductively connected electrodes facing oppositely moving portions of said carriers and cooperating with said carriers and intermediately placed between the collectors.

8. In an electrical machine of the class described, in combination, a movable charge carrier in the form of a belt, means for supporting and driving said belt over pulleys at opposite ends, charge conducting means for causing said charge carrier to deliver charges of opposite sign at opposite ends thereof, charge collectors surrounding opposite ends of said belt, and a substantially airtight housing enclosing the operating portions of said machine.

9. An electrical machine of the class described comprising, in combination, a pair of belts disposed over pulleys and arranged one within the other, charge conducting means associated with a substantially central portion of said belt, and charge collecting means at opposite ends thereof in the form of spheres substantially completely enclosing said pulleys.

10. In an electrical machine of the class described, in combination, a pair of belts, means for supporting and driving said belts one within the other, a charge conductor having a pair of electrodes at opposite ends, said electrodes being disposed outside the outer belt on opposite sides thereof, a second charge conductor having a pair of electrodes disposed on opposite sides of said inner belt and therewithin, and a pair of charge collectors at opposite ends of said belt and surrounding the foci thereof.

11. In an electrical machine of the class described, in combination, a pair of belts, means for supporting and driving said belts one within the other, a charge conductor having a pair of electrodes, said electrodes being disposed exteriorly of the outer belt on opposite sides thereof and offset from each other in the plane of the belt, a second charge conductor having a pair of electrodes disposed on opposite sides of the inner belt and interiorly thereof, and being offset from each other in the plane of said belt, and a pair of charge collectors disposed at opposite ends of said belt.

12. In an electrical machine of the class described, in combination, a pair of belts, means for supporting and driving said belts in opposite directions and one within the other, charge conducting means associated with said belts substantially at the center thereof, a pair of charge collectors disposed at opposite ends of said belt and substantially surrounding the pulley contacting portions thereof, and an envelope surrounding the intermediate portions of said belts and joined to said charge collectors forming a substantially gas-tight enclosure for said belts.

13. In an electrical machine of the class described, in combination, a pair of belts, means for supporting and driving said belts one within the other with relative motion therebetween, means associated with at least one of said belts for preventing excessive friction upon contact therebetween charge conductors associated with said belts, and charge collectors disposed at opposite ends thereof.

14. An electrical machine having a plurality of charge carriers adapted to move in opposite directions along a flattened elliptical path, charge conducting apparatus comprising conductively connected electrodes facing oppositely moving portions of said charge carriers, associated with the carriers intermediate the ends thereof and collectors located adjacent the ends of said path for receiving charges from said carriers.

15. An electrical machine having two charge collectors, two charge carriers comprising endless belts of flexible material extending between the two collectors, charge conducting means comprising conductively connected electrodes facing oppositely moving portions of said belts, associated with said charge carriers, and a plate of insulating material extending between the collectors and disposed between the upper and lower halves of the carriers.

RALPH C. BROWNE.